(12) United States Patent
Dietrich et al.

(10) Patent No.: US 7,531,123 B2
(45) Date of Patent: May 12, 2009

(54) DIRECT MANUFACTURED SELF-CONTAINED PARTS KIT

(75) Inventors: David M. Dietrich, Saint Peters, MO (US); Jeffrey E. Degrange, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 665 days.

(21) Appl. No.: 11/163,694

(22) Filed: Oct. 27, 2005

(65) Prior Publication Data

US 2007/0098929 A1    May 3, 2007

(51) Int. Cl.
*B29C 35/08* (2006.01)
*B29C 41/02* (2006.01)

(52) U.S. Cl. ............... 264/497; 264/113; 264/132; 264/232

(58) Field of Classification Search ........... 264/132, 264/308, 497, 113, 232
See application file for complete search history.

(56) References Cited

U.S. PATENT DOCUMENTS 6,276,607 B1 *  8/2001  Sato ..................... 235/487
2005/0015171 A1 *  1/2005  Cruz-Uribe et al. ......... 700/118

* cited by examiner

*Primary Examiner*—Leo B Tentoni
(74) *Attorney, Agent, or Firm*—Brosemer, Kolefas & Assoc., LLC

(57) ABSTRACT

A self-contained parts kit is created by forming a container around parts formed using a direct manufacturing process. The formation of the container is part of the same process by which the parts are formed. The container can be formed with one or more openings by which the parts can be removed. The container can also be formed with perforations in one or more surfaces to allow the parts therein to be cleaned without removing the parts, such as by shaking or by the external application of a fluid such as pressurized air. Indicia can also be formed on the container.

9 Claims, 3 Drawing Sheets

FIG. 2A FIG. 2B

DIRECT MANUFACTURED SELF-CONTAINED PARTS KIT

FIELD OF THE INVENTION

The present invention relates to the handling and packaging of manufactured items, and in particular, to the handling and packaging of items produced by direct manufacturing techniques.

BACKGROUND INFORMATION

Direct manufacturing, also referred to as rapid manufacturing or rapid prototyping, refers to a variety of manufacturing techniques that allow items to be formed directly from their constituent materials without requiring the often time-consuming and costly creation of dies or molds which are later used to impart the material with the desired shapes of the items. One such direct manufacturing technique is Selective Laser Sintering (SLS) in which light, such as laser light, is controllably directed onto particles of a material to cause the particles to fuse together into a desired shape. The material, such as powdered plastic, is placed in a vat or the like upon which the SLS technique operates. The resultant parts are formed in the powder from which they are dug out. FIG. 1 shows a vat of a typical SLS machine after the formation of parts from a powdered plastic material. The parts are typically further subjected to a stream of pressurized air to blow off any powder remaining thereon.

The handling of parts formed by techniques such as SLS can be problematic, particularly where there are large numbers of small parts involved. Parts can be lost in the powder or in the process of blowing the powder off of the parts. While other manufacturing techniques such as injection molding and extrusion may not suffer from such handling issues, the drawbacks of such techniques, such as their greater up-front costs and slower turn-around, may preclude their use or make them unattractive alternatives for many applications.

Furthermore, after the parts are manufactured, they often need to be packaged, such as by being placed in a container. After being retrieved and cleaned, as described above, the parts may then typically be sorted, counted and placed in a container. An additional operation may be required to form the container. The container may need to be labeled. All of these steps add time, effort and cost.

SUMMARY OF THE INVENTION

In an exemplary embodiment of the present invention, a self-contained parts kit is created including one or more parts and a container for containing the one or more parts. The one or more parts are formed within the container as the container itself is also being formed. The parts and container are thus formed as part of the same process.

The container preferably includes an opening from which the parts can be removed. In a further exemplary embodiment, the aforementioned container is formed to include one or more openings through which excess powdered material can be removed from the container without allowing parts to pass there through. In one such embodiment, one or more walls of the container are perforated with the perforation openings being smaller than the smallest part in the container. The parts can be cleaned without being removed from the container such as by shaking the container or by applying a fluid such as air or a liquid.

In yet a further embodiment, the container includes indicia thereon which can be used, for example, to identify the parts contained therein. The indicia can be formed on the container as part of the same process used to form the container and the parts, or the indicia can be applied to the container after the container is formed.

The present invention can be used in conjunction with a variety of manufacturing techniques, particularly direct manufacturing techniques including, for example, Selective Laser Sintering (SLS), stereolithography (SLA), Fuse Deposition Modeling (FDM), and Electron-Beam Melting (EBM).

DETAILED DESCRIPTION

Figure 1:
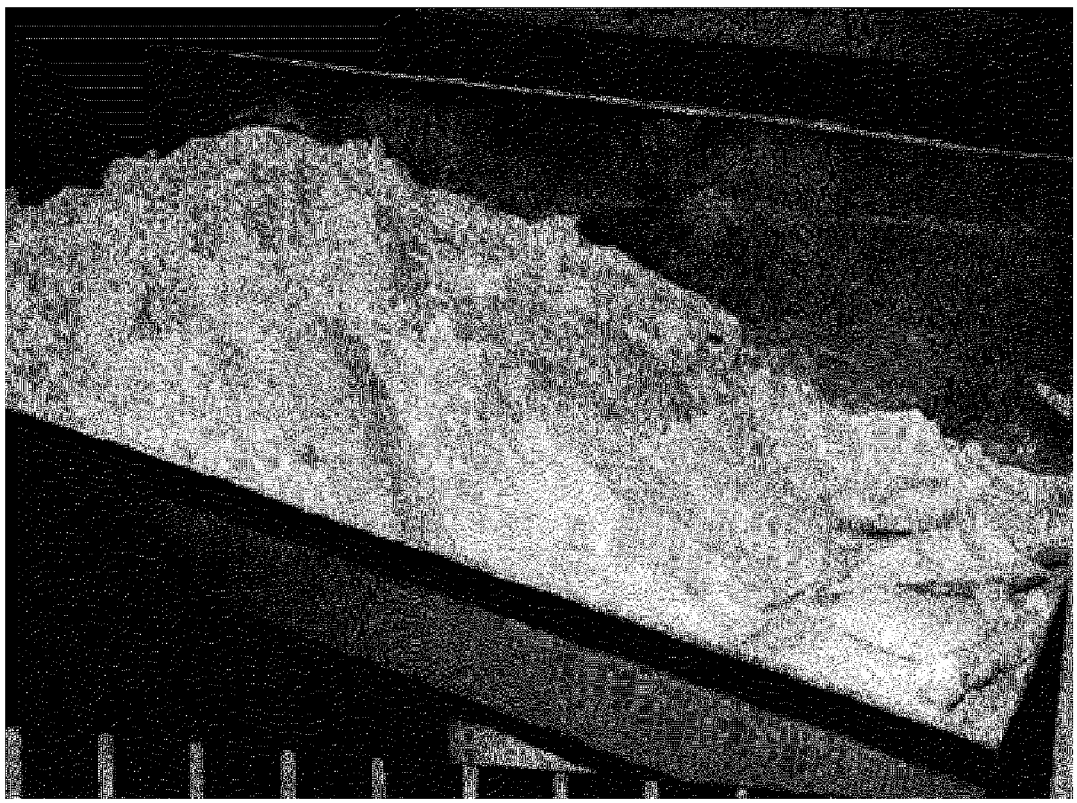
FIG. 1 shows parts manufactured by an SLS direct manufacturing technique as they come out of a conventional SLS machine, typically buried or partially buried in unprocessed powdered material.
Figure 2:
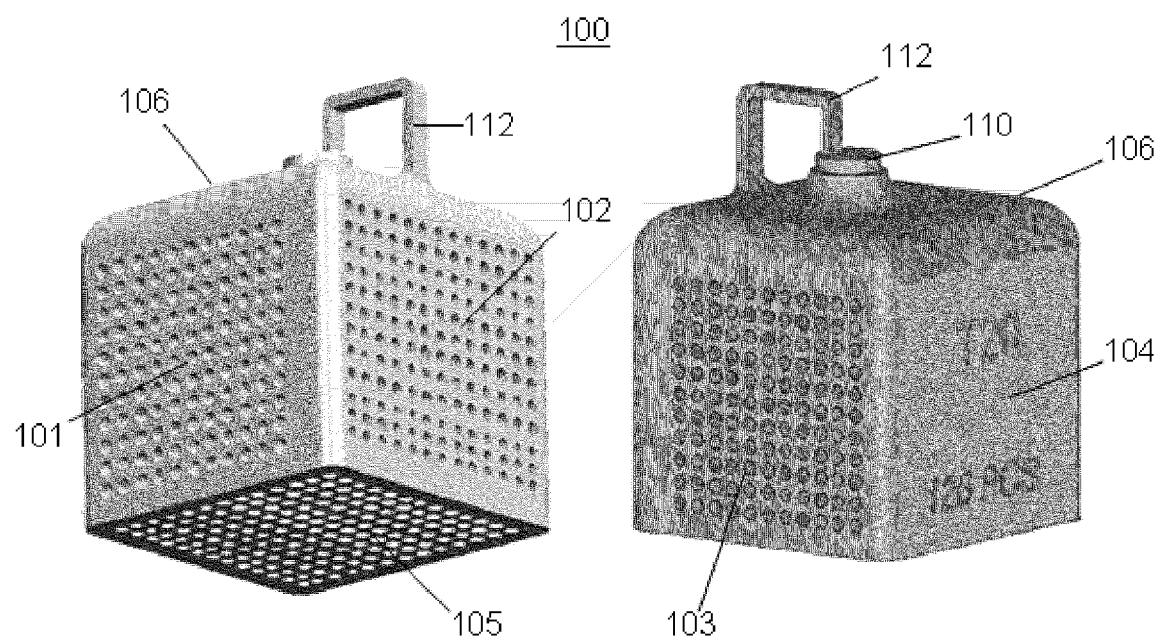
FIGS. 2A and 2B are isometric views of an exemplary embodiment of a container in accordance with the present invention.

An exemplary embodiment of a container 100 in accordance with the present invention is shown isometrically in FIGS. 2A and 2B. The exemplary container 100 is generally cubical in shape, with four side walls 101-104, a bottom wall 105, and a top portion 106. FIG. 2A provides a bottom isometric view of a first perspective of the container 100 whereas FIG. 2B provides a top isometric view of an opposite perspective of the container.

The container 100 is formed as part of a direct manufacturing process by which one or more parts (not shown) are also formed. The container 100 is formed so as to contain the parts therein, thereby yielding a convenient, self-contained parts kit comprising the container 100 and the parts contained within the container. An exemplary direct manufacturing process that can be used to form the parts kit is Selective Laser Sintering (SLS).

As shown in FIGS. 2A and 2B, the side walls 101-103 and the bottom wall 105 are perforated. The perforation openings are preferably smaller than the smallest part contained in the container 100. The container 100 can thus be shaken, blown with air, or washed with a liquid without unintentionally releasing any of the parts contained therein.

The top portion 106 of the container 100, preferably includes an opening 110 by which the parts formed in the container can be removed or by which other items can be placed in the container. The opening 110 can be formed with a cap or a thin layer of material there across which can later be removed to uncover the opening. The removal of the cap or the layer of material would thus provide an indication that the container had been opened. The cap and/or the opening 110 may also be formed with features that allow the cap to be re-used to close the opening.

A handle 112 or the like may also be included on the top portion 106 to aid in the handling of the container.

As shown in FIG. 2B, indicia can be formed on an outer surface of the container 100, such as on the side wall 104. The indicia can be formed as part of the process by which the parts kit is formed or may be applied afterwards. The indicia can provide a variety of information, such as, for example, an identifying designation (e.g. "T20") of the parts in the container, a parts count (e.g. "126 PCS"), a date or place of manufacture, or an image of the parts, among other possibilities.

Indicia can also be provided by the aforementioned perforations. The perforations can be arranged in identifiable patterns such as characters or images, thereby acting as indicia.

In an SLS manufacturing process for forming the parts kit of the present invention, the parts kit is formed from the bottom up, layer-by-layer. As is known, with SLS, each layer of the end product is formed by fusing a desired pattern of powdered material using a laser that is directed onto the material in the desired pattern. As such, the bottom wall 105 of the container 100 is formed first, followed by the side walls 101-104. As the side walls 101-104 are formed, the parts to be contained in the container are also formed. The top portion 106 is formed last.

Figure 3:
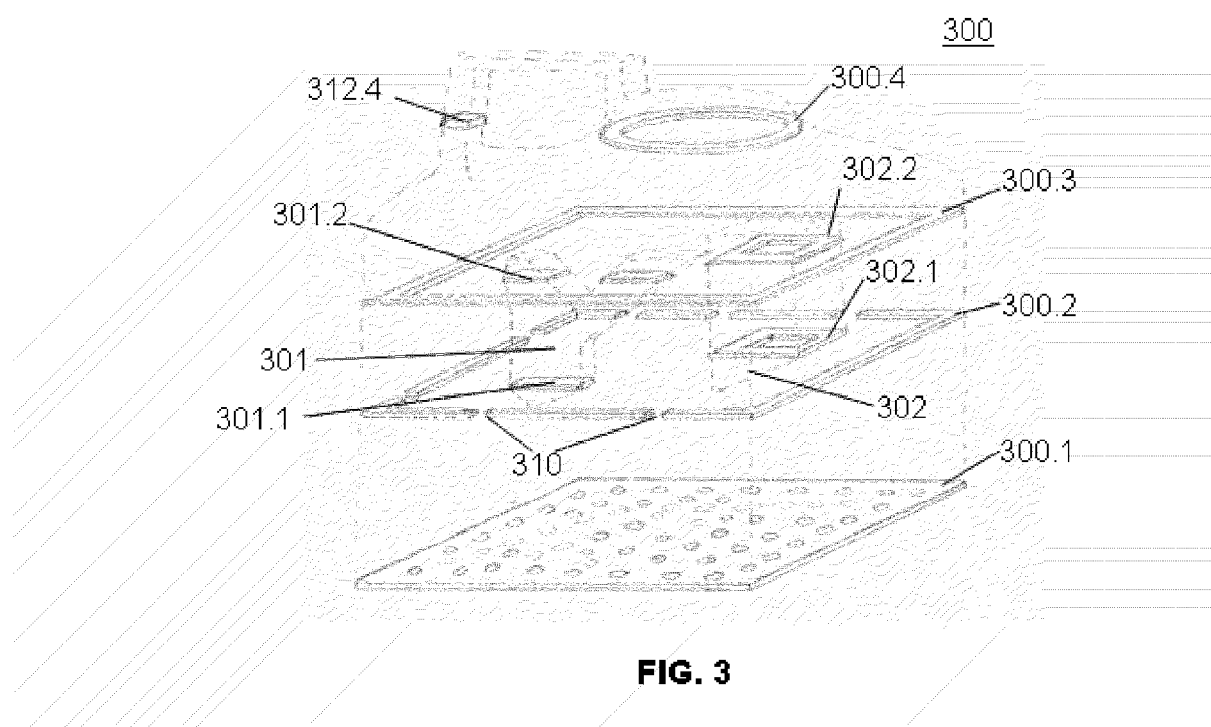
FIG. 3 shows illustrative layers formed during the direct manufacture of an exemplary embodiment of a parts kit in accordance with the present invention.

An exemplary procedure for forming a parts kit 300 in accordance with the present invention will now be described with reference to FIG. 3. The exemplary parts kit 300 comprises a container 100, as described above, and two parts therein, 301 and 302. In FIG. 3, the outlines of the container 100 and the parts 301 and 302 are shown with dotted lines. Exemplary layers 300.N that would be formed in the process of manufacturing the parts kit are shown with solid lines. For instance, layer 300.1 is an exemplary layer that is formed as part of the bottom wall 105 of the container 100. Like bottom wall 105, layer 300.1 is perforated. The layers 300.N are substantially planar.

Layers 300.2 and 300.3 are exemplary layers in the middle portion of the kit. At their perimeters, the layers 300.2 and 300.3 include portions of the sidewalls 101-104. Openings in the perimeters of the layers 300.2 and 300.3 provide the perforations in the sidewalls 101-103. The layers 300.2 and 300.3 also include portions 301.N and 302.N of the parts 301 and 302, respectively.

Layer 300.4 is an exemplary layer in the top portion 106 of the container 100. As seen in FIG. 3, the layer 300.4 includes a part of the upper portion 106 and a portion 312.4 of the handle 112.

As can be seen from the above description, the formation of the container 100 and the formation of the parts (301, 302) overlap; i.e., the period of time during which the parts are formed and the period of time during which the container is formed overlap.

Several variations of the above described embodiments are possible within the scope of the present invention. For example, a container in accordance with the present invention can be formed in a wide variety of shapes, such as, for instance, a cylinder, a cone, an N-sided solid, a curved solid, or a combination of any of the above. In addition, the container need not surround its contents on all sides; for instance, the top portion of the container may be eliminated or altered so that the container is open on top, like a bucket or a pan.

Furthermore, the container may or may not be perforated (i.e., the number of perforations or openings for removal of excess material may be zero or more), the spacing of any perforations or openings can vary, and the shapes of any perforations or openings can vary (e.g., circular, square, diamond). Perforations or openings can be provided on any wall of the container, as can indicia. Moreover, the dimensions of the container 100, including the thickness of the walls, can vary and are limited only by the manufacturing process. For instance, the exemplary container 100 described above has dimensions of approximately 2"×2"×2" with a wall thickness of approximately 0.040".

Moreover, although the present invention has been described using an SLS embodiment, other manufacturing techniques are also contemplated by and within the scope of the present invention, including, for example, SLA, FDM and EBM.

EBM, like SLS yields parts on a bed of powdered material (in this case a metal) that can be blown away, as described above. EBM is essentially the metallic counterpart of SLS. While SLA would typically leave supports holding the parts within the container, as opposed to excess powdered material that can be blown away through perforations in the container such supports can be removed by other means. For example, the container in that case can be formed with a large opening or be open on one side to allow a user or a machine to cut off and remove the supports. Likewise, FDM will typically leave supports. In the case of FDM, however, the supports can be made water-soluble (when materials such as ABS are used) and can be washed away within the container.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A method of making a self-contained parts kit including one or more parts and a container for containing the one or more parts, the method comprising the steps of:
   providing a material in powder form;
   forming the one or more parts during a first time period from the material;
   forming the container for containing the one or more parts during a second time period from the material, including forming one or more openings in the container, wherein at least one of the one or more openings is smaller than the one or more parts; and
   removing excess material in powder form from the container via the at least one of the one or more openings that is smaller than the one or more parts,
   wherein the one or more parts are formed within the container and the first and second time periods overlap.

2. The method of claim 1, wherein the step of forming the parts and the step of forming the container use the same manufacturing technique.

3. The method of claim 2, wherein the manufacturing technique is selective laser sintering.

4. The method of claim 2, wherein the step of forming the one or more parts includes one or more sub-steps of forming a layer of the one or more parts, and the step of forming the container includes one or more sub-steps of forming a layer of the container.

5. The method of claim 4, wherein a layer of the one or more parts is substantially co-planar with a layer of the container.

6. The method of claim 1, wherein at least one of the one or more openings is at least as large as the one or more parts so that the one or more parts can be removed from the container via the at least one of the one or more openings.

7. The method of claim 1, wherein the step of forming the container includes forming indicia on the container.

8. The method of claim 1, comprising cleaning the one or more parts without removing them from the container.

9. The method of claim 1, wherein the container is formed to surround the one or more parts on all sides.

* * * * *